Patented Aug. 10, 1948

2,446,927

UNITED STATES PATENT OFFICE 2,446,927

THICKENED LUBRICANT

Harris D. Hineline, Mount Vernon, N. Y., assignor to Standard Oil Development Company, a corporation of Delaware No Drawing. Application January 1, 1943, Serial No. 471,008

4 Claims. (Cl. 252—48.8)

This invention relates to lubricants, relates especially to thickened lubricants having high viscosity indices; and relates especially to a lubricant containing an isoolefin-diolefin copolymer cured while in solution in the lubricating oil.

Many attempts have been made to modify the tendency of lubricating oil substances to change their viscosity with change in temperature, and a considerable number of substances have been found which serve simultaneously as thickeners, and viscosity index improvers; but the improvement obtainable has been sharply limited in each instance by the properties of the improvers added. Of these improvers, the most satisfactory is the simple, high molecular weight polymer of isobutylene which is highly efficient in increasing the viscosity index of a lubricating oil but the amount of increase obtainable is limited by the fact that the most efficient, high molecular weight polyisobutylenes are not fully stable in a lubricant, and the quantity of the lower molecular weight polymers required is unduly great.

The present invention provides a new and highly efficient thickener and viscosity index improver in the form of a copolymer of an isoolefin such as isobutylene, with a diolefin such as butadiene or isoprene or pentadiene or dimethyl butadiene, or the like; dissolved in an appropriate lubricating oil, and treated in solution with a curing agent to yield a thickener and viscosity index improver of phenomenally high potency. Thus the invention consists in the process of raising the viscosity and viscosity index of a lubricating oil by dissolving therein a copolymer of isobutylene and a diolefin or substituted diolefin substance and thereafter curing or sulfurizing or vulcanizing the polymer while in solution by the application thereto of sulfur with or without a sulfurization accelerator, or other curing substances. Other objects and details of the invention will be apparent from the following description.

The raw materials of the invention consist broadly of a lubricating oil, an isoolefin-diolefin copolymer, and curing agent. The lubricating oil may be of any desired type, either paraffinic or naphthenic, and of any desired grade from the lightest of spindle oils to a heavy grease.

The copolymer element of the invention desirably consists of the low temperature polymer of an isoolefin with a diolefin produced from isobutylene in major proportion, mixed with butadiene or a substituted butadiene in minor proportion at temperatures ranging from −10° C. to −160° C. by the application thereto of a catalyst consisting of an aluminum chloride or other Friedel-Crafts type catalyst dissolved in an alkyl mono or polyhalide having less than about 5 carbon atoms, or in carbon disulfide, or the like. For this purpose isoolefins generally of from 4 to 8 or 9 carbon atoms are useful, and substituted butadienes of from 4 to 12 or 15 carbon atoms are likewise useful. These olefins are cooled by the use of such substances as liquid propane, solid carbon dioxide, liquid ethylene or even liquid methane admixed directly therewith or by similar refrigerants in a refrigerating jacket on the reactor. The catalyst preferably is a dissolved Friedel-Crafts type catalyst selected from the list given by N. O. Calloway in his article on "The Friedel-Crafts synthesis," printed in the issue of "Chemical Reviews," published for the American Chemical Society at Baltimore in 1935, being volume 17, No. 3, the article beginning on page 327, the list being particularly well shown on page 375. The catalyst solvent broadly may be any low freezing non-complex-forming liquid which will dissolve the Friedel-Crafts catalyst. The preferred solvents are the lower alkyl halides although other substances, which are above indicated, are equally useful. The catalyst is preferably mixed rapidly into the cooled olefinic material in as finely dispersed form as possible and the reaction proceeds rapidly to yield a polymer which may have a molecular weight ranging from about 15,000 up to 250,000 or higher up to about 500,000 or 600,000.

The curing agent may be any of the various substances which are useful for vulcanizing rubber, or any substance which will cure the polymer while in oil solution. Of these substances elemental sulfur is useable; elemental sulfur with an appropriate accelerator, such as tetramethyl thiuram disulfide is better, sulfur chloride is still better, para quinone dioxime and its homologues are equally good and dinitrosocymene and its homologues are in some ways the best of all.

The polymer used is preferably of relatively high unsaturation; that is, the unsaturation desirably should be that corresponding to from 1% to 20 to 25% of diolefin in the interpolymer. However, a choice has to be made between the amount of unsaturation and the solubility in the lubricant, since the higher unsaturation lowers the solubility in the hydrocarbon oils. The amount of unsaturation in the polymer also determines the amount of curing agent which will combine with the polymer, and in addition determines to a considerable extent the effectiveness of the polymer as a thickening agent. However, too high an unsaturation is also undesirable since it yields a thickener which is less stable than is desirable for some uses. That is, a moderately heavy lubricating oil containing a substantial percentage of dissolved polymer of relatively high unsaturation when fully cured, may yield a lubricant which is too thick for some purposes, especially if the curing agent is sulfur chloride. On the other hand, a lubricant of high initial viscosity, that is, a heavy oil or grease, with a relatively large amount of polymer of fairly high unsaturation, curved with sulfur monochloride yields a grease which has valuable extreme-pressure lubricant properties and very good temperature characteristics analogous to a high viscosity index.

The lubricating oil base to be used depends upon the desired character of lubricant. If a relatively fluid oil is desired of high viscosity index, a light lubricating oil is selected and a moderate amount of polymer of moderate unsaturation is dissolved in it and cured with a relatively small amount of curing agent. On the other hand, if a heavy oil or grease is desired, the base oil can be much more viscous and the quantity of polymer dissolved can be much higher, of higher unsaturation and cured with a larger quantity of curing agent.

Curing with sulfur yields a material which shows substantially extreme pressure characteristics. Curing with sulfur and an accelerator is preferable, however, since it shows equally good extreme pressure characteristics with a less drastic heat treatment of the oil. Curing with dinitrosocymene does not add appreciably to the extreme pressure properties. Sulfur chloride, however, shows the greatest improvement in extreme pressure characteristics, especially with polymers of a relatively high unsaturation, cured with an excess of sulfur chloride at relatively low temperature, since under these circumstances a maximum amount of sulfur and chlorine are bound into the polymer molecules with a minimum of cross linkage and a minimum of formation of high molecular weight molecule networks. The viscosity of the finished lubricant is determined both by the amount of polymer and the amount of curing agent incorporated, which in turn depends upon the amount of unsaturation in the original polymer; and, especially with sulfur chloride, the presence of an excess of curing agent substantially affects the thickening of the finished lubricant.

In practising the invention, the desired lubricant, as above described, and the copolymer, as above described, are mixed and agitated until the polymer is fully dissolved in the lubricant; or the polymer may be separately dissolved in a light solvent and admixed with the lubricating oil, the latter procedure being particularly advantageous for the preparation of the sulfur lubricants; the light naphtha being vaporized out at any convenient stage of procedure. When the solution is complete, the curing agent is added either alone or as a solution in a suitable solvent such as benzene, naphtha, etc. If sulfur alone is used, considerable quantities are required and the solution must be heated to a temperature ranging from 150° C. to 250° C. or even higher depending upon the stability of the lubricating oil to complete the sulfurization, the reaction requiring from thirty minutes to a considerable number of hours depending upon the particular polymer used and the temperature. Alternatively the time and temperature are sharply reduced by adding with the sulfur an appropriate accelerator, such as the above-mentioned tetramethyl thiuram disulfide, or the like. In this instance also, a certain amount of heating is required; temperatures ranging from 110° C. to 175° C. being suitable, the time of heating ranging from five minutes to one hundred minutes depending upon the temperature, the amount of sulfur and accelerator present and the character both of the oil and the polymer. Alternatively, in the absence of sulfur, para quinone dioxime and its homologues may be used, in which instance also a similar time and temperature schedule is desirable. Similarly, a curing agent, such as dinitrosocymene and the like may be used, in which case the curing takes place at room temperature in the course of from twenty-four to forty-eight hours.

*Example I*

A mixture was prepared consisting of 98 parts of 20 W lubricating oil and two parts of a copolymer containing approximately 98.5 parts of isobutylene and 1.5 parts of isoprene. The polymer was shredded and added to the oil and the mixture heated up to 100° C. for 20–30 minutes until the polymer was fully dissolved. At this stage, 0.25 part of dinitrosocymene in 5 ccs. of benzene were added and the mixture heated until the benzene was evaporated and the mixture was then allowed to stand at room temperature for forty-eight hours.

The viscosities and viscosity indices of the blank oil and of the oil containing the polymer after curing showed the following comparison:

| | Viscosity at 100° F. | Viscosity at 210° F. | V. I. |
|---|---|---|---|
| 20 W (blank) | 231.9 | 44.4 | 22.5 |
| 20 W+0.25 gram dinitrosocymene | 232.2 | 45.2 | 23 |
| 20 W+2% butyl rubber | 319 | 49.8 | 59.8 |
| 20 W+2% isobutylene-isoprene interpolymer cured in situ with 0.25 gram dinitrosocymene | 1981.5 | 170.2 | 118 |

This table shows the five-fold increase in viscosity index with only 2% of addition agent, which is superior to most other addition agents.

In the above example the polymer used had a molecular weight of approximately 15,000 and a molecular weight of approximately this value is preferable, since, if the molecular weight is too high, it tends to be broken down during service, thereby reducing the thickening effect and leaving in use a thinner oil than is desirable. Likewise, a molecular weight much below about 10,000 is undesirable, since it does not give as much improvement either of the viscosity or the viscosity index as is desirable.

Other types of oil and other isoolefinic-diolefinic polymers give similar results as above pointed out.

*Example II*

A similar quantity of paraffinic oil of a considerably higher viscosity was used as solvent for a polymer containing approximately 10% of interpolymerized isoprene with isobutylene and a molecular weight of approximately 15,000. This material was treated with an excess of sulfur monochloride at room temperature and the excess volatilized out by heating the cured mixture to a temperature of approximately 100° C. for a time interval of approximately one hour while blowing with a slow stream of carbon dioxide. This material was found to show a very greatly increased viscosity to the stage of a moderately thick grease which was found to have a good viscosity index and valuable extreme-pressure properties, making it as particularly valuable as a transmission lubricant.

This composition is particularly valuable when made up with a naphthenic base oil since the reactions suggest the probability that a certain amount of intercuring occurs between the unsaturation in the naphthenic base oil and the unsaturation in the dissolved polymer.

It may be noted that with relatively high concentrations of polymer of relatively high unsaturation a material is obtained which has many of the properties of a gel, which, however, is readily broken down by working into a very thick, heavy lubricant which is especially valuable for heavy-duty high-pressure service.

Thus the invention provides a new and useful lubricant having an unusually high viscosity index, composed of an ordinary lubricating oil having therein a cured isoolefinic diolefinic copolymer.

While there are above disclosed but a limited number of embodiments of the invention, it is possible to provide still other embodiments without departing from the inventive concept herein disclosed and it is therefore desired that only such limitations be imposed upon the appended claims as are stated therein or required by the prior art.

I claim:

1. A liquid lubricant comprising in combination a hydrocarbon oil, a polymer in solution therein comprising a major proportion of isobutylene interpolymerized with a minor proportion of a butadiene having from 4 to 15 carbon atoms per molecule, and a curing agent comprising sulfur chloride in chemical combination with the dissolved polymer.

2. A liquid lubricant comprising in combination a hydrocarbon oil, a polymer in solution therein comprising a major proportion of isobutylene interpolymerized with a minor proportion of isoprene, and a curing agent comprising sulfur chloride in chemical combination with the dissolved polymer.

3. A liquid lubricant comprising in combination a hydrocarbon oil, a polymer in solution therein comprising a major proportion of isobutylene interpolymerized with a minor proportion of dimethyl butadiene, and a curing agent comprising sulfur chloride in chemical combination with the dissolved polymer.

4. A liquid lubricant comprising in combination a hydrocarbon oil, a polymer in solution therein comprising a major proportion of isobutylene interpolymerized with a minor proportion of butadiene, and a curing agent comprising sulfur chloride in chemical combination with the dissolved polymer.

HARRIS D. HINELINE.

REFERENCES CITED

The following references are of record in the file of this patent:

UNITED STATES PATENTS

| Number | Name | Date |
| --- | --- | --- |
| 2,181,964 | Chittick | Dec. 5, 1939 |
| 2,195,549 | Wasson | Apr. 2, 1940 |
| 2,213,423 | Wiezevich | Sept. 3, 1940 |
| 2,316,089 | Anderson | Apr. 6, 1943 |

FOREIGN PATENTS

| Number | Country | Date |
| --- | --- | --- |
| 513,521 | Great Britain | Oct. 16, 1939 |
| 112,875 | Australia | Mar. 6, 1940 |

OTHER REFERENCES

Plastics Catalog (1944), published by Plastics Catalog Corp.; pages 894–5, 876–7 and 907.